(12) United States Patent
Goker

(10) Patent No.: US 11,222,659 B1
(45) Date of Patent: Jan. 11, 2022

(54) SPECIALLY FORMATTED TAPE DRIVE FOR ENABLING IMPROVED PERFORMANCE CAPABILITIES IN MULTI-PARTITION MAGNETIC TAPE

(71) Applicant: QUANTUM CORPORATION, San Jose, CA (US)

(72) Inventor: Turguy Goker, Oceanside, CA (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 17/170,646

(22) Filed: Feb. 8, 2021

(51) Int. Cl.
  *G11B 20/12* (2006.01)
  *G11B 5/592* (2006.01)
  *G11B 5/02* (2006.01)

(52) U.S. Cl.
  CPC .............. *G11B 5/5928* (2013.01); *G11B 5/02* (2013.01)

(58) Field of Classification Search
  CPC ......... G11B 20/12; G11B 15/005; G11B 5/54; G11B 27/032; G06F 16/1873; G06F 3/065; G06F 3/0611; G06F 3/0643; G06F 3/0682
  USPC .......................................................... 360/48
  See application file for complete search history.

(56) References Cited

U.S. PATENT DOCUMENTS 9,430,155 B2 * 8/2016 Amir ...................... G06F 3/067

* cited by examiner

*Primary Examiner* — Nabil Z Hindi
(74) *Attorney, Agent, or Firm* — Roeder & Broder LLP; James P. Broder

(57) ABSTRACT

A magnetic tape drive for writing data to a magnetic tape that includes a first data band, a second data band, and a servo band that is positioned between the first data band and the second data band, each of the data bands including a plurality of wraps including a first wrap and a last wrap, includes a drive controller and a tape head. The drive controller defines at least a first partition and a second partition within the magnetic tape. The tape head is configured to write data to the first partition of the magnetic tape and subsequently write data to the second partition of the magnetic tape. The drive controller defines an end of the first partition to be directly after the last wrap of the first data band. The drive controller controls the tape head to write data to all of the plurality of wraps of the first data band.

20 Claims, 5 Drawing Sheets

|  | Defined Partitions | | | |
| --- | --- | --- | --- | --- |
| Partition Layout | 0 | 0,1 | 0, 1, 2 | 0, 1, 2, 3 |
| Partition 0 Start | 0 | 0 | 0 | 0 |
| Partition 0 End | 207 | N | N | N |
| Partition 1 Start | 0 | N+3 | N+3 | N+3 |
| Partition 1 End | 0 | 207 | M | M |
| Partition 2 Start | 0 | 0 | M+3 | M+3 |
| Partition 2 End | 0 | 0 | 207 | P |
| Partition 3 Start | 0 | 0 | 0 | P+3 |
| Partition 3 End | 0 | 0 | 0 | 207 |

Fig. 1 (Prior Art)

|  | Defined Partitions | | |
|---|---|---|---|
| Partition Layout | 0, 1 | 0, 1, 2 | 0, 1, 2, 3 |
| Partition 0 Start | 0 | 0 | 0 |
| Partition 0 End | 103 | 51 | 51 |
| Partition 1 Start | 104 | 52 | 52 |
| Partition 1 End | 207 | 103 | 103 |
| Partition 2 Start | 0 | 104 | 104 |
| Partition 2 End | 0 | 207 | 155 |
| Partition 3 Start | 0 | 0 | 156 |
| Partition 3 End | 0 | 0 | 207 |

Fig. 5

SPECIALLY FORMATTED TAPE DRIVE FOR ENABLING IMPROVED PERFORMANCE CAPABILITIES IN MULTI-PARTITION MAGNETIC TAPE

BACKGROUND

Automated tape library systems (also referred to herein simply as "tape libraries") continue to be a key storage tier in data storage infrastructure, especially for very large scale, data center type applications. Such tape libraries are commonly utilized for purposes of writing data to and reading data from tape cartridges, such as magnetic tape cartridges. Magnetic tape cartridges are configured to retain and/or store magnetic tape that can be used in a magnetic tape drive for purposes of reading data from and writing data to the magnetic tape. In a typical magnetic tape library, there can be hundreds to thousands of magnetic tape drives. During use of the magnetic tape drive, a tape head of the magnetic tape drive is configured to be in direct contact with the magnetic tape from the magnetic tape cartridge so that data can be written to and read from the magnetic tape as the magnetic tape moves across the tape head at high speed.

In various applications, the magnetic tape drive can operate in compliance with an LTO specification, such as LTO-8 or LTO-9, with the magnetic tape cartridges being LTO-compatible tape cartridges that retain LTO-compatible magnetic tape. For example, in an LTO-8 system, the magnetic tape uses 208 wraps that are included within four spaced apart data bands (i.e. data band 0, data band 1, data band 2 and data band 3), with each data band including 52 wraps. Additionally, the magnetic tape further includes five servo bands, which are interspersed with the data bands. In particular, a typical magnetic tape that operates in compliance with LTO-8 specification includes from one lateral edge of the magnetic tape to the other, a first tape edge guard band, a first servo band, data band 3, a second servo band, data band 1, a third servo band, data band 0, a fourth servo band, data band 2, a fifth servo band, and a second edge guard band.

During the writing process, the magnetic tape moves across a write head in both the forward and reverse directions in a series of data wraps, with the writing occurring consecutively through data band 0, data band 1, data band 2 and data band 3. The write head is somewhat wider than the data tracks that are ultimately being written to the magnetic tape, such that each data wrap overlaps the previous data wrap within each data band in a process referred to as shingle writing.

In applications where the magnetic tape is defined by the magnetic tape drive as a single partition tape, e.g., with the single partition including all 208 wraps, any problems that occur with the tape heads, or with data that the user decides to rewrite in any location on the tape except for the last wrap, can require that the entire magnetic tape be rewritten. This can cause many severe time issues when such situations arise. Thus, the magnetic tape drive typically divides the magnetic tape into a series of partitions so as to create a multi-partition tape. In certain applications, the magnetic tape can be divided into two, three or four partitions. In such applications, the partitions can be divided at any point(s) among the 208 wraps. To ensure that any given partition does not impact an adjacent partition when problems may occur with the tape heads, a drive controller of the magnetic tape drive typically utilizes guard wraps that are not written to in order to effectively define the junction between adjacent partitions. With such design, if the user decides to rewrite data that adversely impacts a given partition, only that one partition needs to be rewritten, as the other partitions have been effectively isolated from the problematic partition due to the inclusion of the guard wraps. Stated in another manner, typical LTO or enterprise tapes use multiple partitions where each partition uses one or more pairs of guard wraps to isolate one partition from the others such that rewriting one partition can be done without affecting the data on the neighboring partitions. Writing data in the sections of tape that comprise the guard wraps is not done unless entire data is rewritten due to shingle writing. Thus, the use of these guard wraps where the data is not allowed to be written enables the rewrite of each partition independently of the other partitions, however at a cost of capacity and performance. It is appreciated that the drive controller in typical magnetic tape drives is configured to define and utilize such guard wraps regardless of how the individual partitions are defined, e.g., even if each partition in a four-partition magnetic tape that is LTO-8 compatible includes exactly 52 wraps.

FIG. 1 is a table illustrating layouts of wraps on a magnetic tape that is used with a prior art tape drive, with the magnetic tape alternatively including one, two, three or four partitions.

By way of example, a host application can use an LTO-8 system that uses 208 wraps and four data bands, with two guard wraps being included between partitions. In certain applications, the partitions can be defined such that each partition fits into a separate data band. This is a unique way to partition tape, however it is a preferred method where a multi-partition format is used along with erasure coded tapes. If four partitions are used where each partition is equal size, then the first three partitions (i.e. partition 0, partition 1 and partition 2) will use the first 50 of the 52 wraps in a given data band as data wraps while leaving the last two wraps to be used as guard wraps between partitions 0 and 1, 1 and 2, and 2 and 3, totaling six wraps to be wasted. In particular, using the table of FIG. 5, N=49, such that partition 0 can have data written in wraps 0-49 (with wraps 50-51 used as guard wraps), M=101, such that partition 1 can have data written in wraps 52-101 (with wraps 102-103 used as guard wraps), and P=153, such that partition 2 can have data written in wraps 104-153 (with wraps 154-155 used as guard wraps). It is appreciated that partition 3 has 52 wraps, and data can be written in all of wraps 156-207, since it does not need the guard wraps. This means the first three partitions will have two wraps of less capacity compared to the last one to enable a given partition to be rewritten without affecting the other partitions due to shingle writing. In the case of an LTO-9 system, because the track density is much higher, multiple pairs of guard bands will be required, resulting in a higher capacity hit.

Drive manufacturers typically develop formats that provide a range of capacities where they advertise the nominal values as the target capacity. For example, with LTO-8, the 12 TB advertised capacity is the nominal capacity, where 11.6 TB capacity is the minimum capacity. Since each wrap regardless of partition can hold a maximum of 59.69 GB (in an ideal case with no stop writes and no rewrites), partitions 0, 1 and 2 will have a maximum size of 2.984 TB based on 50 data wraps each. Partition 3 will have 3.104 TB capacity since this last partition does not require its own guard wraps.

Using 12 TB per tape capacity, partition capacity (except for partition 3) becomes 2.884 TB for 50 wraps. Therefore, as long as the host application writes less than or equal to 2.884 TB per partition, the drive and tape will have minimum 3.46% excess capacity allowance for tape defects and stop writes. This is called 12 TB equivalent four-partition dataset equivalent capacity size. With 3.46% excess capacity in LTO-8 systems, the tape drive can typically write at least 11.67 TB, which meets the format's 11.6 TB minimum capacity. Therefore, in such situations, the tape drive may still allow read and write operations without claiming hardware problems per format.

In a given example application, the host application can select 2.88 TB for their data set size, which meets the 12 TB equivalent four-partition size where the maximum size per format is 2.884 TB. With this selection, the margin for partitions 0, 1 and 2 will be 3.63% and for partition 3 it will be 7.8%.

In most cases, the system successfully completes the writes with proper End of Partition (EOP) being written. However, when a given drive has a shorted, clogged, dead or open reader sensor (tunneling magnetoresistive (TMR) sensor), the loss of a single TMR sensor in a typical 32 head construction can be enough to cause a severe capacity loss for the application unless it is detected early in the usage. For instance, with LTO-8 format, a loss of a single TMR sensor will result in 5.2% minimum capacity loss such that an advertised 12 TB capacity cannot be maintained and the application will encounter EOP errors with high certainty. With the addition of typical tape defects that require rewrites and stop-write tracking errors which also require rewrites, this can result in 6.2% capacity loss for a single head sensor failure. Even in ideal conditions, 5.2% rewrites due to the dead channel will write only maximum of 2.83 TB therefore resulting in guaranteed EOP problems. Thus, when constant capacity is used where the application tries to fit large sizes of data chunks to single or multi-partition formats, capacity loss can result in unexpected EOP errors which can happen after many hours of operation. This is mostly a problem for very large scale, data center type applications, where the tape library system cannot afford the loss of capacity and must benefit from nominal capacity.

SUMMARY

The present invention is directed toward a magnetic tape drive that is specially formatted so as to effectively utilize the servo bands within an LTO-compatible magnetic tape as natural guards for purposes of defining partitions within the magnetic tape, thereby enabling data in any partition to be written and rewritten in all wraps of a data band without affecting any other partition. This enables desired capacity savings due to elimination of the guard wraps that are used with prior art magnetic tape drives.

More specifically, in various embodiments, the present invention is directed toward a magnetic tape drive for writing data to a magnetic tape that includes a first data band, a second data band, and a servo band that is positioned between the first data band and the second data band, each of the data bands including a plurality of wraps including a first wrap and a last wrap, including a drive controller and a tape head. The drive controller defines at least a first partition and a second partition within the magnetic tape. The tape head is configured to write data to the first partition of the magnetic tape and subsequently write data to the second partition of the magnetic tape. The drive controller defines an end of the first partition to be directly after the last wrap of the first data band. The drive controller controls the tape head to write data to all of the plurality of wraps of the first data band.

In some embodiments, the tape head is configured to write data consecutively to the first data band and then the second data band. In certain such embodiments, the drive controller defines a beginning of the second partition to be before the first wrap of the second data band.

In certain embodiments, the tape head is configured to write data consecutively to the first data band and then the second data band. In some such embodiments, the drive controller defines an end of the second partition to be directly after the last wrap of the second data band. The drive controller can further control the tape head to write data to all of the plurality of wraps of the second data band.

In some embodiments, the magnetic tape further includes a third data band and a second servo band that is positioned between the second data band and the third data band. In such embodiments, the drive controller can further define a third partition within the magnetic tape. The tape head can also be configured to write data to the third partition after writing data to the first partition and the second partition.

In certain embodiments, the tape head is configured to write data to the third data band after writing data to the first data band and the second data band. In some such embodiments, the drive controller defines a beginning of the third partition to be before the first wrap of the third data band.

In various embodiments, the tape head is configured to write data to the third data band after writing data to the first data band and the second data band. In certain such embodiments, the drive controller defines an end of the third partition to be directly after the last wrap of the third data band. The drive controller can further control the tape head to write data to all of the plurality of wraps of the third data band.

In certain embodiments, the magnetic tape further includes a fourth data band and a third servo band that is positioned between the third data band and the fourth data band. In such embodiments, the drive controller can further define a fourth partition within the magnetic tape. The tape head can also be configured to write data to the fourth partition after writing data to the first partition, the second partition and the third partition.

In some embodiments, the tape head is configured to write data to the fourth data band after writing data to the first data band, the second data band and the third data band. In certain such embodiments, the drive controller defines a beginning of the fourth partition to be before the first wrap of the fourth data band.

In various embodiments, the tape head is configured to write data to the fourth data band after writing data to the first data band, the second data band and the third data band. In some such embodiments, the drive controller defines an end of the fourth partition to be after the last wrap of the fourth data band. The drive controller can further control the tape head to write data to all of the plurality of wraps of the fourth data band.

The present invention is also directed toward a tape library system including a tape cartridge that retains the magnetic tape, and the tape drive as described above that is configured to write data to and read data from the magnetic tape.

The present invention is further directed toward a method for writing data to a magnetic tape that includes a first data band, a second data band, and a servo band that is positioned between the first data band and the second data band, each of the data bands including a plurality of wraps including a first wrap and a last wrap, the method including the steps of defining at least a first partition and a second partition within the magnetic tape with a drive controller; writing data to the first partition of the magnetic tape with a tape head; subsequently writing data to the second partition with the tape head; defining an end of the first partition with the drive controller to be directly after the last wrap of the first data band; and controlling the tape head with the drive controller to write data to all of the plurality of wraps of the first data band.

The present invention is also directed toward a tape drive for writing data to a magnetic tape that includes a first data band, a second data band, a third data band, a fourth data band, a first servo band that is positioned between the first data band and the second data band, a second servo band that is positioned between the second data band and the third data band, and a third servo band that is positioned between the third data band and the fourth data band, each of the data bands including a plurality of wraps including a first wrap and a last wrap, the tape drive including a drive controller that defines at least a first partition, a second partition, a third partition and a fourth partition within the magnetic tape; and a tape head that is configured to write data consecutively to the first partition of the magnetic tape, then to the second partition of the magnetic tape, then to the third partition of the magnetic tape, and then to the fourth partition of the magnetic tape; wherein the drive controller defines an end of the first partition to be directly after the last wrap of the first data band; wherein the drive controller defines a beginning of the second partition to be before the first wrap of the second data band; wherein the drive controller defines an end of the second partition to be directly after the last wrap of the second data band; wherein the drive controller defines a beginning of the third partition to be before the first wrap of the second data band; wherein the drive controller defines an end of the third partition to be directly after the last wrap of the third data band; wherein the drive controller defines a beginning of the fourth partition to be before the first wrap of the fourth data band; wherein the drive controller defines an end of the fourth partition to be after the last wrap of the fourth data band; and wherein the drive controller controls the tape head to write data to all of the plurality of wraps of the first data band, all of the plurality of wraps of the second data band, all of the plurality of wraps of the third data band, and all of the plurality of wraps of the fourth data band.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a table illustrating layouts of wraps on a magnetic tape that is used with a prior art tape drive;

FIG. 5 is a table illustrating exemplary layouts of wraps on a multi-partition magnetic tape that is used with the tape drive having features of the present invention.

DESCRIPTION

Figure 2:
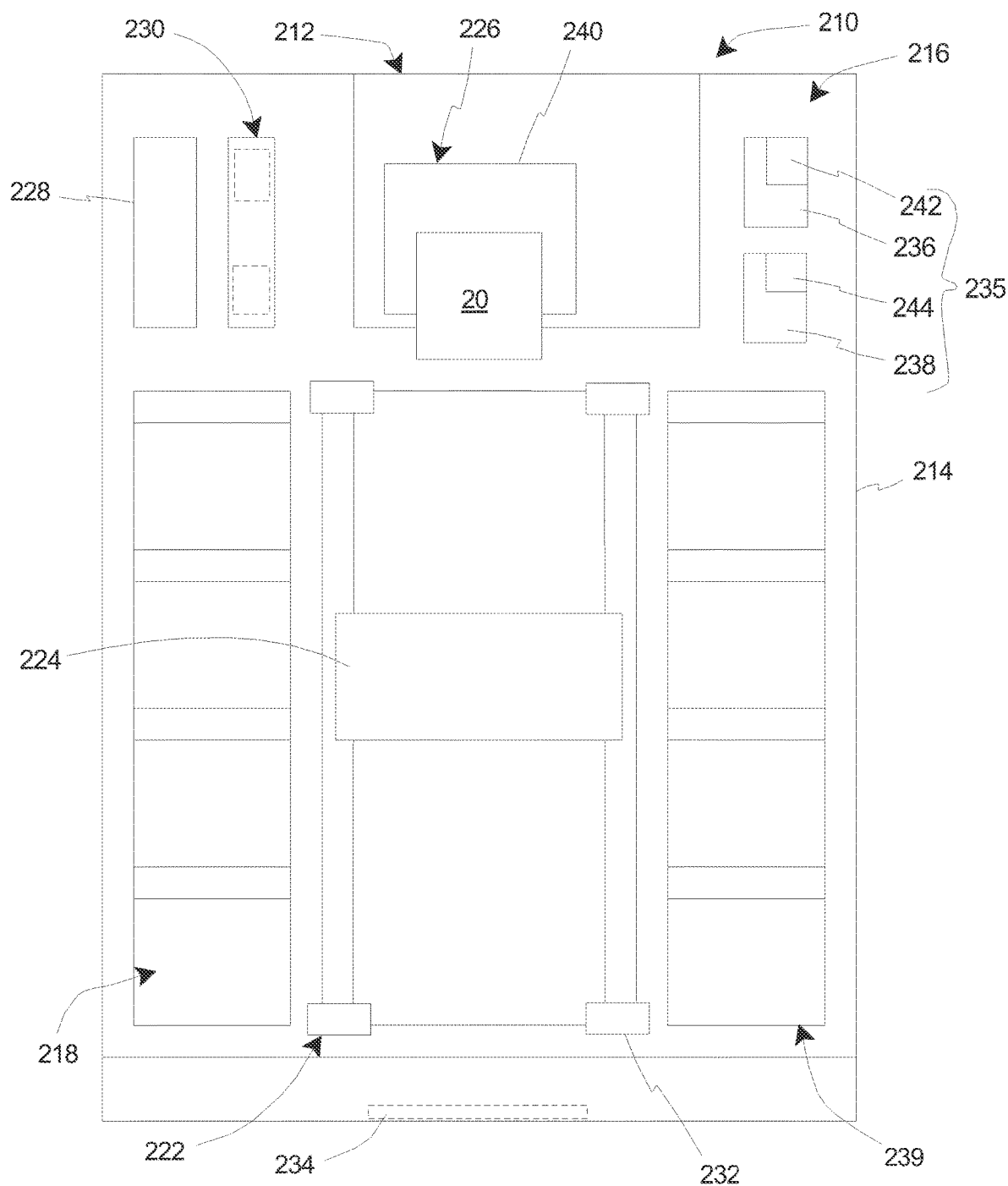
FIG. 2 is a simplified schematic top view illustration of an embodiment of an automated tape library system including one or more tape drives having features of the present invention.

Embodiments of the present invention are described herein in the context of a specially formatted tape drive for enabling improved performance capabilities in a multi-partition magnetic tape. In particular, the present invention utilizes a specially formatted tape drive to define partitions within the magnetic tape that coincide with the size (i.e. the beginnings and the ends) of the data bands, and thus uses the servo bands positioned between the data bands as a natural means of isolation between adjacent partitions. As provided in greater detail herein, the partitions can be defined such that a first partition ends immediately following the last wrap of a first data band, and a tape head of the tape drive can write data to all wraps within the first data band. As used herein, the "last wrap" of any given data band typically is positioned immediately adjacent to a servo band, as provided herein. A second partition can be defined to begin with the first wrap of a second data band, and end with the last wrap of the second data band, and the tape head can write data to all wraps of the second data band. This process of defining the partitions in such manner can be continued through all of the defined partitions of the magnetic tape. With such design, there is no data capacity loss in such transitional space between the partitions, and overall performance can be improved.

In various embodiments, a drive controller of the magnetic tape drive is specially formatted so as to effectively utilize and define the servo bands as natural guards between partitions, thus enabling data in any partition to be written and rewritten to all wraps of a data band without affecting any other partition. For example, such method can be effectively utilized in applications when four equal size partitions are used with four data bands or four equal size partitions are used with eight data bands, or with any other suitable configurations. This enables the capacity savings due to elimination of specifically designated guard wraps. Also, as capacities increase in future generations, the track densities also increase resulting in narrower track pitches. This method of using servo bands as guards also eliminates the need for more tracks as guards as capacities increase, thereby saving real estate on tapes for future generations of magnetic tape.

Thus, the present invention utilizes the already existing servo bands as natural guards to isolate partitions, thereby eliminating capacity loss and improving performance. By way of specific examples, for four partition formats, the present invention can increase LTO-8 usable capacity by 4% and LTO-9 usable capacity by 6.1%, which allows hyper-scale applications using erasure coded tapes to lower the cents/GB tape cost. Additionally, in certain applications, the elimination of guard wraps with the present invention provides sufficient additional excess capacity such that the failure of a single head will not necessarily result in EOP problems that require a given partition to be rewritten.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 2 is a simplified schematic top view illustration of an automated tape library system 210 (also referred to herein simply as a "tape library"), including a tape drive system 212 that includes one or more tape drives 226 having features of the present invention that are configured for writing data to and/or reading data from a magnetic tape 350 (illustrated in FIG. 3) that is retained within a tape cartridge 220. In FIG. 2, a top cover (not shown) has been omitted for clarity so that the interior of the tape library 210 is visible. The tape library 210 can have any suitable design that is capable of storing a plurality of tape cartridges 220. More specifically, it is noted that the tape library 210 illustrated in FIG. 2 is just one non-exclusive example of a tape library 210 usable with the present invention, and no limitations are intended based on the specific type and/or size of the tape library 210 shown in FIG. 2.

In various embodiments, as illustrated, the tape library 210 can include one or more of: (i) a library housing 214 that defines an library interior 216, (ii) a plurality of storage slots 218 that are each configured to receive and selectively retain (and store) a tape cartridge 220, (iii) a rack assembly 222, (iv) a tape cartridge retrieval assembly 224 (also sometimes referred to herein as a "retrieval assembly"), (v) the tape drive system 212 including the one or more tape drives 226, (vi) a power supply 228, (vii) a library control system 230, (viii) one or more racks 232, (ix) a graphical user interface 234 (illustrated in phantom, and also sometimes referred to herein as a "GUI"), and (x) a climate controller 235.

As an overview, the one or more tape drives 226 can be specially formatted to utilize servo bands within the magnetic tape 350 as natural guards between partitions, thereby obviating the need for separate guard wraps which would otherwise enable less overall data capacity. More specifically, a drive controller 368 (illustrated in FIG. 3) of the tape drive 226 is specially formatted so as to effectively utilize and define the servo bands as natural guards between partitions, thus enabling data in any partition to be written and rewritten to all wraps of a data band without affecting any other partition, and without experiencing data capacity loss in the transitional space between the partitions.

The library housing 214 is configured to retain various components of the tape library 210. For example, in the embodiment illustrated in FIG. 2, the plurality of storage slots 218, the rack assembly 222, the retrieval assembly 224, the one or more tape drives 226 of the tape drive system 212, the power supply 228, the library control system 230, the rack(s) 232, and the climate controller 235 can all be received and retained at least substantially, if not entirely, within the library interior 216. As illustrated in FIG. 2, the library housing 214 can be rigid and can have a substantially rectangular-shaped cross-section. Alternatively, the library housing 214 can have another suitable shape or configuration. For example, the library housing 214 can have a substantially square-shaped or any other suitable shaped cross-section. Further, the library housing 214 may be constructed of any number of conventional materials such as, for example, those utilized in industry standard rack mount cabinets.

The plurality of storage slots 218 can be positioned within the library housing 214, with the storage slots 218 being configured to receive and retain (and store) the tape cartridge(s) 220. More particularly, in various embodiments, each of the storage slots 218 is configured to receive and retain a single tape cartridge 220. It is noted that no tape cartridges 220 are shown as being retained within the storage slots 218 in FIG. 2 for clarity.

The tape library 210 can include any suitable number of storage slots 218, and/or the tape library 210 can be designed to retain any suitable number of tape cartridges 220. Moreover, the storage slots 218 can be arranged within the tape library 210 in any suitable manner. For example, in certain embodiments, the tape library 210 can include two magazines 239, one on each side of the retrieval assembly 224, with each magazine 239 including any suitable number of storage slots 218 that are configured to receive and retain any suitable number of tape cartridges 220. For example, in certain non-exclusive alternative embodiments, the tape library 210 can be configured to include hundreds or even thousands of storage slots 218, each being configured to receive and retain a separate tape cartridge 220.

The design and configuration of the rack assembly 222 can be varied to suit the specific requirements of the tape library 210. For example, in one non-exclusive embodiment, the rack assembly 222 can include four individual racks 232 that are spaced apart from one another. In some embodiments, each rack 232 can be oriented in a generally vertical direction and can extend a height that is sufficient to enable the retrieval assembly 224 to effectively retrieve a tape cartridge 220 from any of the plurality of storage slots 218. Alternatively, the rack assembly 222 can include greater than or less than four racks 232 that can be spaced apart from one another.

The retrieval assembly 224 selectively, e.g., upon request of a user or host application, retrieves and moves the tape cartridges 220 as desired between the storage slots 218 and the tape drives 226. In particular, during use, upon receiving a signal from the library control system 230 to access a certain tape cartridge 220, the retrieval assembly 224 can be manipulated to physically retrieve the requested tape cartridge 220 from its associated storage slot 218 in the tape library 210. Subsequently, the retrieval assembly 224 moves the tape cartridge 220 to an appropriate tape drive 226, and inserts the tape cartridge 220 into a drive housing 240 of the tape drive 226 so that the requested read/write operations can be performed. Upon completion of the requested read/write operations, the retrieval assembly 224 can then return the tape cartridge 220 to an appropriate storage slot 218.

It is appreciated that although a single retrieval assembly 224 is illustrated in FIG. 2, the tape library 210 can be designed to include more than one retrieval assembly 224. For example, in one non-exclusive alternative embodiment, the tape library 210 can include two retrieval assemblies 224 that function in different portions of the tape library 210 and/or that provide redundancy in the event that one of the retrieval assemblies 224 fails.

The one or more tape drives 226 are configured for reading and/or writing data with respect to the tape cartridge 220. Additionally, as noted, the one or more tape drives 226 are configured to define the partitions within the multi-partition magnetic tape 350 in such a manner as to enable excess overall data capacity, while still enabling each partition to be rewritten independently of the other partitions when necessary, e.g., such as due to the failure of one of the tape heads of the head assembly 356 (illustrated in FIG. 3) of the tape drive 226.

The number of tape drives 226 provided within the tape library 210 can be varied to suit the specific requirements of the tape library 210. For example, in certain embodiments, the tape library 210 can include three tape drives 226 that are stacked substantially one on top of another (with limited spacing therebetween). Alternatively, the tape library 210 can include greater than three or fewer than three tape drives 226 and/or the tape drives 226 can be positioned in a different manner relative to one another. For example, in certain non-exclusive alternative embodiments, the tape library 210 can be configured to include one hundred or more tape drives 226. In some embodiments, the tape library 210 can include more than a single tape drive system 212 for purposes of providing the one or more tape drives 226.

The power supply 228 provides electrical power in a well-known manner to the one or more tape drives 226, the retrieval assembly 224, the library control system 230 and/or additional tape libraries 210. The power supply 228 can be interfaced with these components as well as with an external power source in a well-known manner using industry standard cabling and connections. Alternatively, the power supply 228 can be interfaced with these components in another manner.

The library control system 230 provides the desired and necessary control for oversight functionality of the tape library 210. The library control system 230 can have any suitable design, many of which are well-known in the industry. For example, in one embodiment, the library control system 230 can include a standard driver interface unit for receiving digital commands and translating the commands into driving currents, such as step pulses for controlling stepper motors, and/or for controlling the climate controller 235. Further, the library control system 230 can include a standard programmable general-purpose computer formed on a single plug-in card unit and can include a programmed microprocessor or microcontroller, memory, communication interface, control interface, connectors, etc. Alternatively, the library control system 230 can have a different design and/or the library control system 230 can be positioned within the tape library 210 in a different position or manner than that illustrated in FIG. 2.

The tape library 210 can use well-known industry standard cabling and communication protocols between the library control system 230 and other structures of the tape library 210. Cabling and electrical characteristics including signaling protocols can be generally standardized, and the logical message protocols can be either proprietary or standardized as known to those skilled in the art.

As shown, the tape library 210 can also include the GUI 234, such as an interactive touchscreen graphical user interface or another suitable graphical user interface, which allows the user or host to interact with and/or transmit requests or commands to and/or from the tape library 210.

The climate controller 235 controls the climate within the library interior 216. In various embodiments, the climate controller 235 can regulate, adjust, control and/or maintain a specific climate within the library interior 216. In certain embodiments, the climate controller 235 includes (i) a temperature controller 236 (including a cooling unit and/or a heating unit) that can include one or more temperature sensors 242 that are usable for purposes of regulating and/or adjusting the temperature within the library interior 216 of the tape library 210; and (ii) a humidity controller 238 (including a humidifier and/or a dehumidifier) that can include one or more humidity sensors 244 that are usable for purposes of regulating and/or adjusting the humidity within the library interior 216 of the tape library 210.

Figure 3:
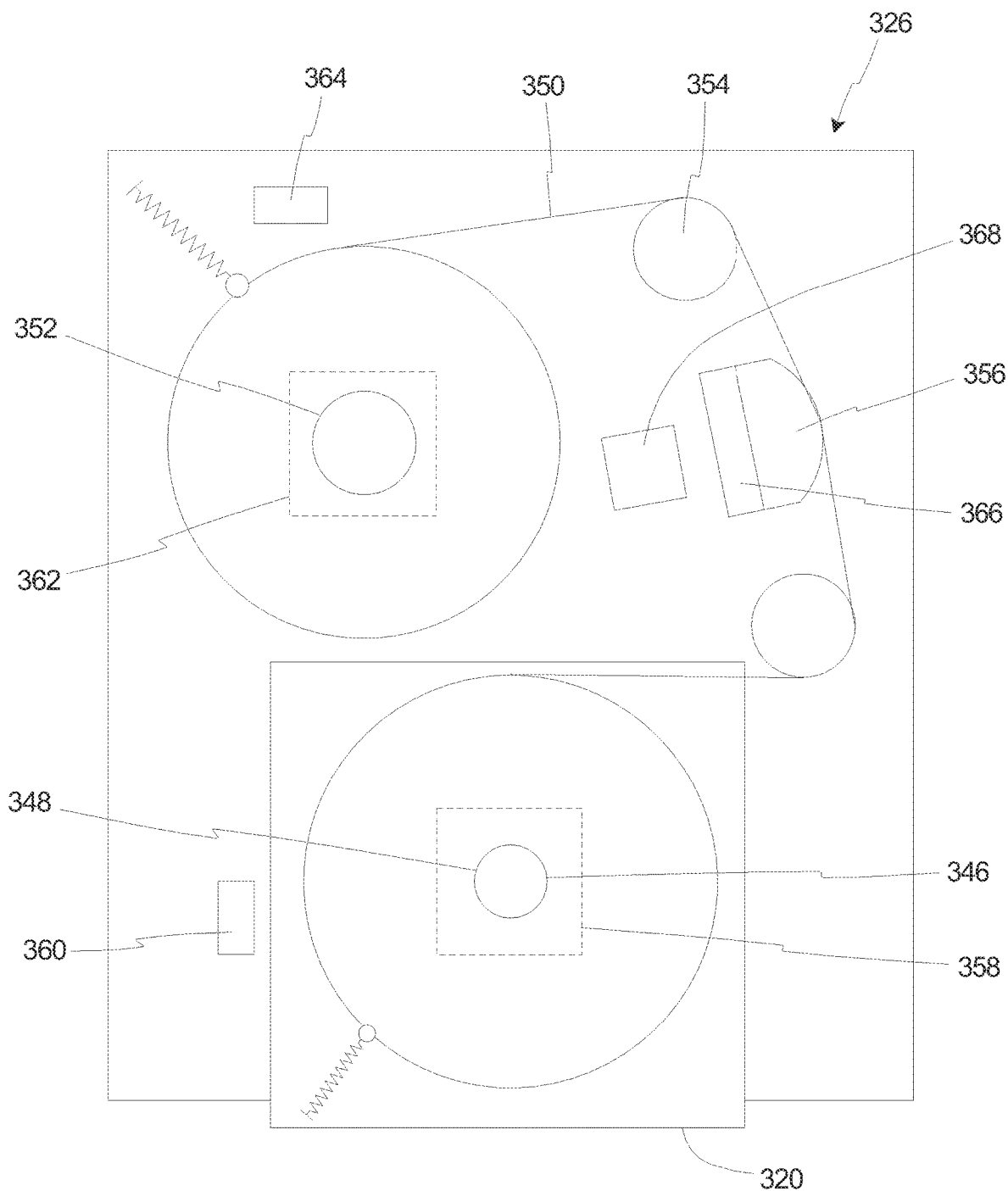
FIG. 3 is a simplified schematic top view illustration of an embodiment of the tape drive, and a tape cartridge that has been inserted into the tape drive, which can be included as part of the tape library system illustrated in FIG. 2.

FIG. 3 is a simplified schematic top view illustration of a tape drive 326, and a tape cartridge 320 that has been inserted into the tape drive 326, which can be included as part of the tape library system 210 illustrated in FIG. 2. It is appreciated that the tape drive 326 as shown in FIG. 3 represents a generic tape drive that can be formatted to include features of the present invention, and is shown by way of example and not by way of limitation. In some embodiments, the tape drive 326 operates in compliance with an LTO specification, such as LTO-8 or LTO-9. Stated in another manner, in such embodiments, the tape cartridge 320 is an LTO-compatible tape cartridge.

During use of the tape drive 326, the tape cartridge 320 is inserted into the tape drive 326 to read data from and/or write data to the tape cartridge 320. As shown, the tape cartridge 320 includes a cartridge reel 346 that includes and/or defines a cartridge hub 348. A magnetic tape 350 is spooled about the cartridge hub 348 of the cartridge reel 346. In certain embodiments, the magnetic tape 350 can include a plurality of servo tracks or bands (not shown in FIG. 3) and a plurality of data tracks or bands (not shown in FIG. 3) that run along a longitudinal length of the magnetic tape 350. Each of these tracks can be positioned substantially parallel to each other. Additionally, the data tracks or bands can also be separated into any desired number of partitions to form a multi-partition magnetic tape 350.

The tape cartridge 320 supplies the magnetic tape 350 to the tape drive 326. More particularly, when the tape cartridge 320 is inserted into the tape drive 326, one end of the magnetic tape 350 is taken up within the tape drive 326 to be wrapped around a drive reel 352 included in the tape drive 326. The magnetic tape 350 traverses a predefined path between the cartridge reel 346 and the drive reel 352, which is defined, a least in part, by one or more rollers 354 (two are shown in FIG. 3) positioned at strategic positions along the predefined path. The rollers 354 may also aid in limiting gross lateral movement (i.e. in and out of the page as shown in FIG. 3) of the magnetic tape 350, i.e. lateral tape motion or "LTM".

Along the predefined path, the drive reel 352 moves the magnetic tape 350 across a head assembly 356 (also sometimes referred to herein as a "tape head" or simply a "head") that is configured to read data from and/or write data to the magnetic tape 350. In alternative embodiments, the head assembly 356 can include at least one read head, at least one write head, and/or at least one read/write head. In particular, the head assembly 356 is positioned in close proximity to the predefined path of the magnetic tape 350 such that as the magnetic tape 350 travels in the longitudinal direction in a series of wraps (i.e. by being wound in a forward longitudinal direction from the cartridge reel 346 to the drive reel 352 or in a backward longitudinal direction from the drive reel 352 to the cartridge reel 346), the head assembly 356 can read/write data to particular tracks and longitudinal positions of the magnetic tape 350. Additionally, the head assembly 356 and/or a separate head assembly can include a plurality of servo elements configured to read the servo tracks or bands of the magnetic tape 350 in order to effectively maintain proper alignment between the head assembly 356 and the magnetic tape 350. It is appreciated that the tape drive 326 can include any suitable number of tape heads within the head assembly 356 for purposes of reading data from and/or writing data to the magnetic tape 350. For example, in one non-exclusive embodiment, the head assembly 356 can include 32 heads for purposes of reading data from and/or writing data to the magnetic tape 350

In some embodiments, as shown, the tape drive 326 can also include a cartridge reel motor 358 (illustrated as a box in phantom) that generates the necessary force to rotate the cartridge reel 346 at will, and a cartridge reel encoder 360, e.g., a sensor or detector, that is configured to output signals representing the pulse rate (or rotation rate) of the cartridge reel motor 358. The tape drive 326 can further include a drive reel motor 362 (illustrated as a box in phantom) that generates the necessary force to rotate the drive reel 352 at will, and a drive reel encoder 364, e.g., a sensor or detector, that is configured to output signals representing the pulse rate (or rotation rate) of the drive reel motor 362.

As illustrated in this embodiment, the tape drive 326 also includes an actuator 366 and a drive controller 368 that can be communicatively coupled to the head assembly 356. The actuator 366 is configured to control the lateral position of the head assembly 356 and/or the individual heads of the head assembly 356 relative to the magnetic tape 350 based on a signal provided by the drive controller 368. As such, the actuator 366 comprises a mechanical positioner to move the head assembly 356 up or down laterally. By controlling the lateral position of the head assembly 356 relative to the magnetic tape 350, particular tracks of the magnetic tape 350 can be accessed as desired. Alternatively, the tape drive 326 can include more than one actuator 366. For example, the tape drive 326 can include a separate actuator 366 for each head.

The drive controller 368 is in communication with the actuator 366 and a number of other components within the tape drive 326. For example, although not specifically shown in FIG. 3, each of the cartridge reel motor 358, the cartridge reel encoder 360, the drive reel motor 362, and the drive reel encoder 364 can be in communication with the drive controller 368. As such, the drive controller 368 can be configured to perform various specified operations, either individually, or in combination with other software, hardware and/or firmware elements.

Importantly, with the present invention, firmware, software and/or hardware elements within the drive controller 368 can further be configured to define partitions within the magnetic tape 350 that utilize the servo bands as natural guard barriers between adjacent partitions within the magnetic tape 350.

Figure 4:
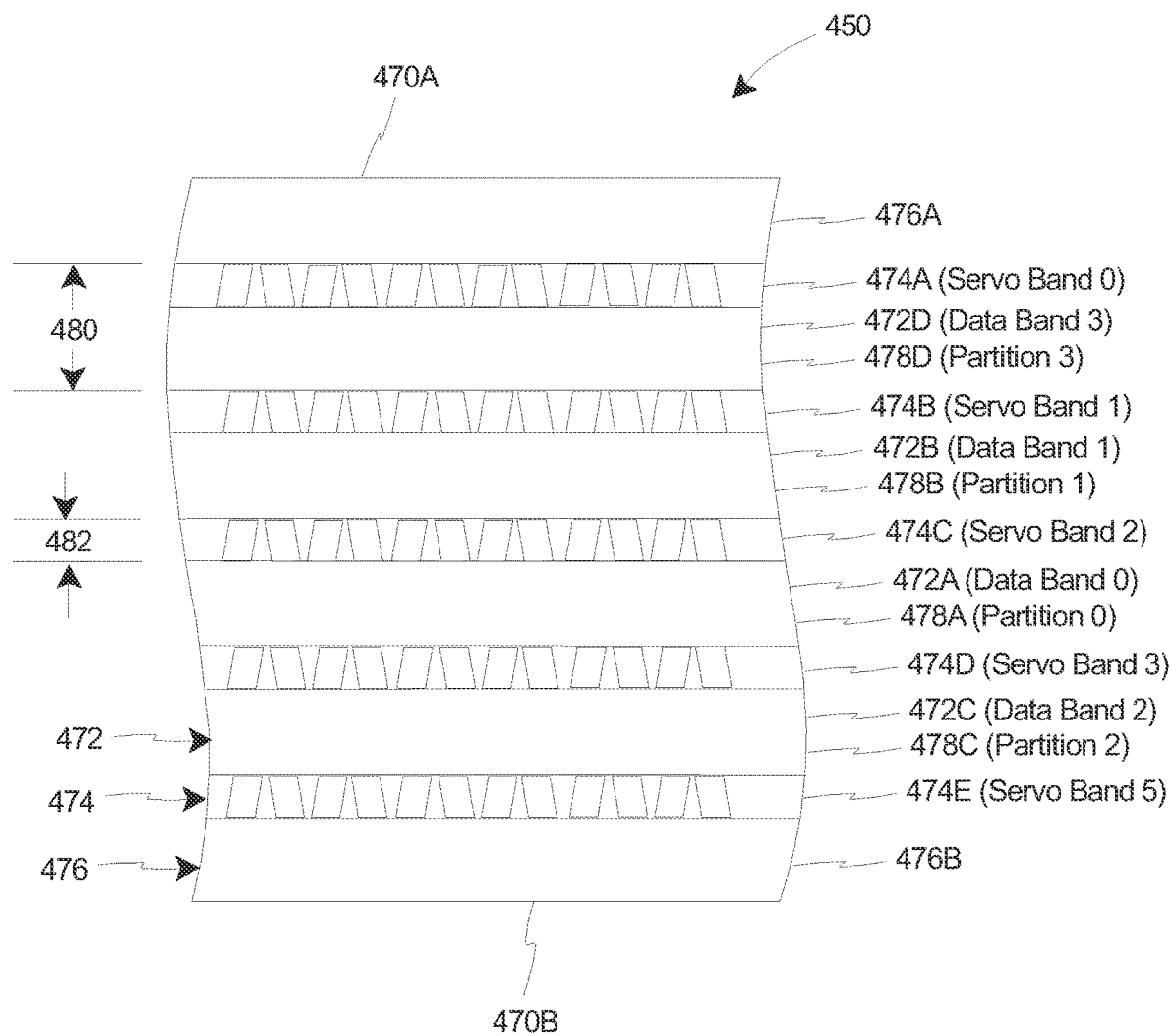
FIG. 4 is a simplified schematic illustration of a portion of a magnetic tape that is usable with the tape drive illustrated in FIG. 3.

FIG. 4 is a simplified schematic illustration of a portion of a magnetic tape 450 that is usable with the specially formatted tape drive 326 illustrated in FIG. 3. In particular, FIG. 4 is a simplified schematic illustration of a portion of a typical magnetic tape 450 that is usable within the LTO-8 format. Stated in another manner, the magnetic tape 450 is an LTO-8 compatible magnetic tape.

As illustrated, the magnetic tape 450 includes a first lateral edge 470A and an opposed second lateral edge 470B, and a plurality of data bands 472 and a plurality of servo bands 474 that extend longitudinally from a beginning (not shown) of the magnetic tape 450 to an end (not shown) of the magnetic tape 450 in a direction transverse to the direction from the first lateral edge 470A to the second lateral edge 470B.

In certain embodiments, during use, the data is written to the plurality of data bands 472 in a particular order. More specifically, in such embodiments, data is written consecutively to a first data band 472A (labeled as data band 0), then to a second data band 472B (labeled as data band 1), then to a third data band 472C (labeled as data band 2), and finally to a fourth data band 472D (labeled as data band 3). Alternatively, data can be written to the data bands 472 in another suitable order. Moreover, it is appreciated that the use of the terms "first data band", "second data band", "third data band" and "fourth data band" herein is merely for convenience and ease of illustration, and any of the data bands can be referred to as the "first data band", the "second data band", the "third data band" and/or the "fourth data band". It is understood that although the present disclosure describes and illustrates the use of four data bands, the intent is that the present disclosure use usable with magnetic tape that uses any suitable number of data bands, e.g., fewer than or greater than four data bands, and that no limitation is intended thereby.

As shown, the plurality of data bands 472A-472D are spaced apart from one another, with the plurality of servo bands 474 being interspersed in an alternating manner with the data bands 472A-472D. Further, each of the lateral edges 470A, 470B is protected by a tape edge guard band 476. In particular, in the embodiment illustrated in FIG. 4, the magnetic tape 450 is configured from the first lateral edge 470A to the second lateral edge 470B with a first tape edge guard band 476A, a first servo band 474A (labeled as servo band 0), the fourth data band 472D (data band 3), a second servo band 474B (labeled as servo band 1), the second data band 472B (data band 1), a third servo band 474C (labeled as servo band 2), the first data band 472A (data band 0), a fourth servo band 474D (labeled as servo band 3), the third data band 472C (data band 2), a fifth servo band 474E (labeled as servo band 4), and the second tape edge guard band 476B.

It is appreciated that the use of the terms "first servo band", "second servo band", "third servo band", "fourth servo band" and "fifth servo band" herein is merely for convenience and ease of illustration, and any of the servo bands can be referred to as the "first servo band", the "second servo band", the "third servo band", "the fourth servo band" and/or the "fifth servo band", etc. It is understood that although the present disclosure describes and illustrates the use of five servo bands, the intent is that the present disclosure use usable with magnetic tape that uses any suitable number of servo bands, e.g., fewer than or greater than five servo bands, and that no limitation is intended thereby.

In one embodiment, with the drive controller 368 (illustrated in FIG. 3) defining partitions of the magnetic tape 450 to be of equal sizes by utilizing the servo bands 474A-474E as natural guards, the first data band 472A (data band 0) is defined as and/or can also be referred to as a first partition 478A, the second data band 472B (data band 1) is defined as and/or can also be referred to as a second partition 478B, the third data band 472C (data band 2) is defined as and/or can also be referred to as a third partition 478C, and the fourth data band 472D (data band 3) is defined as and/or can also be referred to as a fourth partition 478D. Moreover, without the need for separate guard bands, all of the wraps within each partition 478A-478D are usable for writing data. More specifically, in this embodiment, the drive controller 368 controls a tape head of the head assembly 356 (illustrated in FIG. 3) to write data (i) to all of the wraps of the first data band 472A in the first partition 478A; (ii) to all of the wraps of the second data band 472B in the second partition 478B; (iii) to all of the wraps of the third data band 472C in the third partition 478A; and (iv) to all of the wraps of the fourth data band 472D in the fourth partition 478A. Stated in another manner, with such design, in this LTO-8 compatible magnetic tape 450, the first partition 478A includes all 52 of wraps 0-51 in the first data band 472A as data wraps to which data can be written; the second partition 478B includes all 52 of wraps 52-103 in the second data band 472B as data wraps to which data can be written; the third partition 478C includes all 52 of wraps 104-155 in the third data band 472C as data wraps to which data can be written; and the fourth partition 478D includes all 52 of wraps 156-207 of the fourth data band 472D as data wraps to which data can be written.

It is appreciated that with the features of the present invention, the end of any given partition 478A-478D coincides with the last wrap of any given data band 472A-472D, i.e. the drive controller 368 defines the end of the partition 478A-478D to be after the last wrap of the respective data band 472A-472D; and the beginning of any given partition 478A-478D coincides with the first wrap of any given data band 472A-472D, i.e. the drive controller 368 defines the beginning of the partition 478A-478D to be before the first wrap of the respective data band 472A-472B. For example, in a magnetic tape 450 with four data bands and only two defined partitions, the drive controller 368 defines the first partition to end at after the last wrap of the first data band 472A, the second data band 472B or the third data band 472C, and the drive controller 368 defines the second partition to start before the first wrap of the second data band 472B, the third data band 472C or the fourth data band 472D. Somewhat similarly, in a magnetic tape 450 with four data bands and three defined partitions, the drive controller 368 defines the first partition to end after the last wrap of the first data band 472A or the second data band 472B; the drive controller 368 defines the second partition to start before the first wrap of the second data band 472B or the third data band 472C; the drive controller 368 defines the second partition to end after the last wrap of the second data band 472B or the third data band 472C; and the drive controller 368 defines the third partition to start before the first wrap of the third data band 472C or the fourth data band 472D.

It is also appreciated that the method of the present invention of using the servo bands positioned between the data bands as natural guard bands is scalable such that it can be utilized to realize the desired benefits with a magnetic tape having any suitable number of data wraps by defining any suitable number of partitions. Additionally, it is further appreciated that the method can still be effective if more than one data band is included within any of the defined partitions. For example, in certain non-exclusive alternative applications, the method can be effectively used on a magnetic tape including eight data bands by defining four partitions, e.g., with each partition including two data bands or the partitions including different numbers of data bands; or the method can be used on a magnetic tape including eight data bands by defining eight partitions, e.g., with each partition including one data band.

FIG. 5 is a table illustrating exemplary layouts of wraps on a multi-partition magnetic tape, e.g., magnetic tape 450 (illustrated in FIG. 4), that is used with the tape drive having features of the present invention, with the magnetic tape alternatively including two, three or four partitions.

For example, as shown in FIG. 5, if two partitions are used for a magnetic tape that is compatible with LTO-8 standards, i.e. with 208 wraps within four data bands, the first partition (partition 0) can include all of wraps 0-51 from the first data band as data wraps, and the second partition (partition 1) can include all of wraps 52-207 from the second, third and fourth data bands as data wraps. Stated in another manner, the separation between the first partition and the second partition can be defined to occur between the first data band and the second data band, with one of the servo bands positioned to function as a natural guard between the partitions. It is recognized that although the magnetic tape shown and described herein includes 208 wraps, this is for ease of understanding only, and that magnetic tapes having greater or fewer than 208 wraps can equally be utilized with the devices and methods disclosed herein.

As further shown in FIG. 5, if three partitions are used for a magnetic tape that is compatible with LTO-8 standards, the first partition (partition 0) can include all of wraps 0-51 from the first data band as data wraps, the second partition (partition 1) can include all of wraps 52-103 from the second data band as data wraps, and the third partition (partition 2) can include all of wraps 104-207 from the third and fourth data bands as data wraps. Stated in another manner, the separation between the first partition and the second partition can be defined to occur between the first data band and the second data band, and the separation between the second partition and the third partition can be defined to occur between the second data band and the third data band. At each junction between partitions, at least one of the servo bands can be positioned to function as a natural guard between the partitions.

As also shown in FIG. 5, if four partitions are used for a magnetic tape that is compatible with LTO-8 standards, the first partition (partition 0) can include all of wraps 0-51 from the first data band as data wraps, the second partition (partition 1) can include all of wraps 52-103 from the second data band as data wraps, the third partition (partition 2) can include all of wraps 104-155 from the third data band as data wraps, and the fourth partition (partition 3) can include all of wraps 156-207 from the fourth data band as data wraps. Stated in another manner, the separation between the first partition and the second partition can be defined to occur between the first data band and the second data band, the separation between the second partition and the third partition can be defined to occur between the second data band and the third data band, and the separation between the third partition and the fourth partition can be defined to occur between the third data band and the fourth data band. At each junction between partitions, at least one of the servo bands can again be positioned to function as a natural guard between the partitions.

In summary, the present invention provides a solution for EOP problems that typically occur due to failure of a TMR sensor. As described, the proposed fix is simple and only requires a change in firmware within the drive controller of the tape drive, and does not require any complex tracking algorithm changes. This method no longer requires guard bands to isolate adjacent partitions, with the servo bands now providing a natural isolation between the partitions. More specifically, the method uses the last two wraps of a given data band, which were previously utilized as guard wraps, as data wraps for rewriting data due to the failed TMR sensor where rewrites are at a minimum 5.2% due to a single failed TMR sensor plus tape defects and stop writes. Thus, the proposed method enables an improved tape drive with better overall performance, by providing a solution to the problem of too often requiring rewrites due to EOP problems experienced due to a single failed TMR sensor, and while still enabling each partition of a multi-partition magnetic tape to be written and rewritten independently of the other partitions so as to not affect any of the other partitions.

Again using a four-partition magnetic tape as an example, the present method allows the tape drive to write same 12 TB equivalent four partition data, which is 2.884 TB, using all 52 wraps in each partition, instead of 50 wraps. Based on format calculations, the resultant excess capacity allowance will now be total of 7.6% instead of the previous 3.46%.

Thus, now even with a failed TMR sensor, the system will still be able to finish writing the desired amount of data without an EOP error as long as basic tape defect and stop write related rewrites are below 2.4%. This means that, in most cases, the system will not experience an EOP problem even with a single failed TMR sensor, thereby resulting in improved performance capabilities for a multi-partition magnetic tape.

Current estimates show users seeing a 4-6% failure rate in writing 2.88 TB backups using this four-partition format. Assuming the user is using 10,000 tape drives, the user can experience 400-600 drive failures mostly due to single TMR sensor failures. With the method described herein, it is believed that approximately 98% of these EOP problems can be avoided due to the additional margin provided with the excess data capacity. Additionally, this methodology can also inhibit tracking-related rewrite issues including cases where rewrites temporarily spike due to a transient debris. Overall, this proposal, with a firmware change only, is an effective means for making LTO-8 more robust especially for hyperscale applications. It is further believed that the benefits of this method will only be amplified with LTO-9.

It is understood that although a number of different embodiments of the magnetic tape drive 26 have been illustrated and described herein, one or more features of any one embodiment can be combined with one or more features of one or more of the other embodiments, provided that such combination satisfies the intent of the present invention.

While a number of exemplary aspects and embodiments of the magnetic tape drive 26 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A tape drive for writing data to a magnetic tape that includes (i) a plurality of data bands including a first data band and a second data band, and (ii) a plurality of servo bands including a first servo band that is positioned directly between the first data band and the second data band, each of the data bands having a plurality of wraps including a last wrap, the last wrap being positioned immediately adjacent to the first servo band, the tape drive comprising:
   a tape head that is configured to write data within a first partition of the magnetic tape and subsequently write data within a second partition of the magnetic tape; and
   a drive controller that defines the first partition and the second partition on the magnetic tape, the drive controller being configured to end the first partition immediately following writing data to the last wrap of the first data band and before the first servo band, the drive controller being configured to control the tape head to write data to the plurality of wraps of the first data band including the last wrap of the first data band.

2. The tape drive of claim 1 wherein the tape head is configured to write data to the first data band and then to the second data band, the drive controller defining a beginning of the second partition to include a first wrap of the second data band, the first wrap of the second data band being immediately adjacent to the first servo band.

3. The tape drive of claim 1 wherein the plurality of servo bands includes a second servo band that is positioned immediately adjacent to the last wrap of the second data band, the tape head being configured to write data consecutively to the first data band and then the second data band, the drive controller being configured to end the second partition immediately following writing data to the last wrap of the second data band and before the second servo band, the drive controller being configured to control the tape head to write data to the plurality of wraps of the second data band including the last wrap of the second data band.

4. The tape drive of claim 3 wherein the plurality of data bands includes a third data band, the second servo band being positioned between the second data band and the third data band, the drive controller defining a third partition on the magnetic tape, the tape head being configured to write data within the third partition subsequent to writing data within the second partition.

5. The tape drive of claim 4 wherein the tape head is configured to write data to the third data band after writing data to the second data band, the drive controller being configured to define a beginning of the third partition to include a first wrap of the third data band.

6. The tape drive of claim 4 wherein the tape head is configured to write data to the third data band after writing data to the first data band and the second data band, the drive controller ending the third partition immediately following writing data to the last wrap of the third data band, the drive controller being configured to control the tape head to write data to the plurality of wraps of the third data band including the last wrap of the third data band.

7. The tape drive of claim 6 wherein the plurality of data bands includes a fourth data band, and the plurality of servo bands includes a third servo band that is positioned between the third data band and the fourth data band, the drive controller defining a fourth partition within the magnetic tape, the tape head being configured to write data within the fourth partition after writing data within the third partition.

8. The tape drive of claim 7 wherein the tape head is configured to write data to the fourth data band after writing data to the third data band, the drive controller defining a beginning of the fourth partition to include the first wrap of the fourth data band.

9. The tape drive of claim 7 wherein the tape head is configured to write data to the fourth data band after writing data to the third data band, the drive controller ending the fourth partition immediately following the last wrap of the fourth data band, the drive controller controlling the tape head to write data to the plurality of wraps of the fourth data band including the last wrap of the fourth data band.

10. A tape library system including a tape cartridge that retains the magnetic tape, and the tape drive of claim 1 that is configured to write data to the magnetic tape.

11. A method for writing data to a magnetic tape that includes a first data band, a second data band, and a plurality of servo bands including a first servo band that is positioned directly between the first data band and the second data band, the method comprising the steps of:
   defining at least a first partition and a second partition within the magnetic tape with a drive controller;
   writing data within the first partition of the magnetic tape with a tape head;
   subsequently writing data within the second partition with the tape head;
   defining an end of the first partition with the drive controller to be immediately following a last wrap of the first data band; and
   controlling the tape head with the drive controller to write data to a plurality of wraps of the first data band, including the last wrap of the first data band and before the first servo band.

12. The method of claim 11 wherein the step of writing data includes writing data to the first data band and then to the second data band with the tape head, and further comprising the step of defining a beginning of the second partition with the drive controller to include a first wrap of the second data band.

13. The method of claim 11 wherein the step of writing data includes writing data to the first data band and then the second data band with the tape head, and further comprising the steps of ending the second partition with the drive controller immediately following a last wrap of the second data band, and controlling the tape head with the drive controller to write data to a plurality of wraps of the second data band including the last wrap of the second data band.

14. The method of claim 13 wherein the magnetic tape further includes a third data band and a second servo band that is positioned immediately following the second data band, and the step of defining at least a first partition and a second partition further includes defining a third partition within the magnetic tape with the drive controller, and further comprising the step of writing data within the third partition with the tape head after writing data to the second partition.

15. The method of claim 14 wherein the step of writing data includes writing data to the third data band with the tape head after writing data to the second data band; and further comprising the step of defining a beginning of the third partition with the drive controller to include a first wrap of the third data band.

16. The method of claim 14 wherein the step of writing data includes writing data to the third data band with the tape head after writing data to the second data band, and further comprising the steps of ending the third partition with the drive controller to immediately follow writing to a last wrap of the third data band, and controlling the tape head with the drive controller to write data to a plurality of wraps of the third data band including the last data wrap of the third data band.

17. The method of claim 16 wherein the magnetic tape further includes a fourth data band and a third servo band that is positioned immediately following the third data band, the step of defining at least a first partition and a second partition further including defining a fourth partition within the magnetic tape with the drive controller, and further comprising the step of writing data within the fourth partition with the tape head after writing data to the third partition.

18. The method of claim 17 wherein the step of writing data includes writing data to the fourth data band with the tape head after writing data to the third data band, and further comprising the step of defining a beginning of the fourth partition with the drive controller to include a first wrap of the fourth data band.

19. The method of claim 17 wherein the step of writing data includes writing data to the fourth data band with the tape head after writing data to the third data band, and further comprising the steps of ending the fourth partition with the drive controller to immediately follow a last wrap of the fourth data band, and controlling the tape head with the drive controller to write data to a plurality of wraps of the fourth data band including the last wrap of the fourth data band.

20. A tape drive for writing data to a magnetic tape that includes a first data band, a second data band, a third data band, a fourth data band, a plurality of servo bands including (i) a first servo band that is positioned between the first data band and the second data band, (ii) a second servo band that is positioned immediately adjacent to the second data band, and (iii) a third servo band that is positioned immediately adjacent to the third data band, each of the data bands having a plurality of wraps including a last wrap, the tape drive comprising:

a drive controller that defines at least a first partition, a second partition, a third partition and a fourth partition within the magnetic tape; and a tape head that is configured to write data consecutively to the first partition of the magnetic tape, then to the second partition of the magnetic tape, then to the third partition of the magnetic tape, and then to the fourth partition of the magnetic tape;

wherein the drive controller defines an end of the first partition to be immediately following the last wrap of the first data band and before the first servo band, the drive controller defining a beginning of the second partition to include the first wrap of the second data band, the drive controller ending the second partition immediately following the last wrap of the second data band and before the second servo band, the drive controller defining a beginning of the third partition to include a first wrap of the second data band, the drive controller ending the third partition immediately following the last wrap of the third data band and before the third servo band, the drive controller defining a beginning of the fourth partition to include a first wrap of the fourth data band, and the drive controller controlling the tape head to write data to (i) the plurality of wraps of the first data band including the last wrap of the first data band, (ii) the plurality of wraps of the second data band including the last wrap of the second data band, (iii) the plurality of wraps of the third data band including the last wrap of the third data band, and (iv) the plurality of wraps of the fourth data band.

\* \* \* \* \*